(12) United States Patent
Wang et al.

(10) Patent No.: US 10,972,395 B2
(45) Date of Patent: Apr. 6, 2021

(54) METHOD AND DEVICE FOR GRANTING AND ACQUIRING QUALIFICATION

(71) Applicant: Xiaomi Inc., Beijing (CN)

(72) Inventors: Yang Wang, Beijing (CN); Changbing Chen, Beijing (CN); Qiang Fu, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 400 days.

(21) Appl. No.: 15/174,522

(22) Filed: Jun. 6, 2016

(65) Prior Publication Data

US 2016/0285772 A1 Sep. 29, 2016

Related U.S. Application Data

(63) Continuation of application No. PCT/CN2015/077961, filed on Apr. 30, 2015.

(30) Foreign Application Priority Data

Dec. 12, 2014 (CN) .......................... 201410770939.6

(51) Int. Cl.
*H04L 12/851* (2013.01)
*G06F 16/951* (2019.01)
(Continued)

(52) U.S. Cl.
CPC ............ *H04L 47/24* (2013.01); *G06F 16/951* (2019.01); *G06Q 30/0207* (2013.01);
(Continued)

(58) Field of Classification Search
CPC ..... H04L 47/24; H04L 67/1004; H04L 63/10; G06F 17/30864; G06F 16/951;
(Continued)

(56) References Cited

U.S. PATENT DOCUMENTS 6,876,983 B1 * 4/2005 Goddard ................ G06Q 30/02
705/26.2
7,756,753 B1 * 7/2010 McFarland ............ G06Q 30/02
705/26.1
(Continued)

FOREIGN PATENT DOCUMENTS

CN 1359500 A 7/2002
CN 1372213 A 10/2002
(Continued)

OTHER PUBLICATIONS

Office Action dated Sep. 30, 2016, in counterpart Russian Application No. 2015127814/07(043167).
(Continued)

*Primary Examiner* — Michael Won
(74) *Attorney, Agent, or Firm* — Finnegan, Henderson, Farabow, Garrett & Dunner, L.L.P.

(57) ABSTRACT

A method for granting a qualification includes receiving a qualification sharing request sent by a granting account for granting a granted account a prioritized application qualification for a target service, detecting whether the granting account has previously used the target service, and, if the granting account has previously used the target service, granting the granted account the prioritized application qualification.

15 Claims, 11 Drawing Sheets

(51) Int. Cl.
  *G06Q 30/02* (2012.01)
  *G06Q 50/00* (2012.01)
  *H04L 29/08* (2006.01)
(52) U.S. Cl.
  CPC ......... *G06Q 30/0214* (2013.01); *G06Q 50/01* (2013.01); *H04L 67/1004* (2013.01)
(58) Field of Classification Search
  CPC ........... G06Q 30/0207; G06Q 30/0214; G06Q 50/01; G06Q 30/0605
  USPC ........................................................ 709/223
  See application file for complete search history.

(56) References Cited

U.S. PATENT DOCUMENTS

| | | | |
|---|---|---|---|
| 8,606,717 B2 * | 12/2013 | Gross | G06Q 30/06 705/51 |
| 8,812,592 B2 | 8/2014 | Deng | |
| 9,055,077 B2 * | 6/2015 | Lindley | G06F 21/6245 |
| 9,245,284 B2 * | 1/2016 | Hardin | G06Q 30/0273 |
| 9,331,994 B2 * | 5/2016 | Grigg | H04L 63/08 |
| 9,462,077 B2 * | 10/2016 | Zohar | H04L 67/322 |
| 10,068,257 B1 * | 9/2018 | Mosthaf | G06Q 30/0269 |
| 2006/0036491 A1 * | 2/2006 | Leung | G06Q 30/0249 705/14.24 |
| 2007/0055439 A1 * | 3/2007 | Denker | G06Q 10/02 701/532 |
| 2008/0086537 A1 | 4/2008 | Vaughan et al. | |
| 2010/0125490 A1 * | 5/2010 | Kiciman | G06Q 30/02 705/14.1 |
| 2011/0047598 A1 * | 2/2011 | Lindley | H04L 63/101 726/4 |
| 2011/0066497 A1 * | 3/2011 | Gopinath | G06Q 30/02 705/14.53 |
| 2011/0167059 A1 * | 7/2011 | Fallah | G06Q 30/08 707/723 |
| 2011/0238608 A1 * | 9/2011 | Sathish | G06Q 30/02 706/47 |
| 2011/0320441 A1 * | 12/2011 | Lee | G06F 16/9535 707/723 |
| 2012/0005224 A1 * | 1/2012 | Ahrens | H04W 4/21 707/769 |
| 2012/0278127 A1 * | 11/2012 | Kirakosyan | G06Q 30/0631 705/7.29 |
| 2013/0031173 A1 * | 1/2013 | Deng | G06Q 30/0255 709/204 |
| 2013/0218652 A1 * | 8/2013 | Fargo | G06Q 30/02 705/14.16 |
| 2013/0318180 A1 * | 11/2013 | Amin | G06Q 30/0269 709/206 |
| 2014/0095722 A1 * | 4/2014 | Long | H04L 47/70 709/226 |
| 2014/0101005 A1 * | 4/2014 | Baset | G06Q 10/10 705/30 |
| 2014/0164508 A1 * | 6/2014 | Lynch | H04L 29/08081 709/204 |
| 2014/0214666 A1 * | 7/2014 | Isaacson | G06Q 20/10 705/41 |
| 2015/0113156 A1 * | 4/2015 | Smith | H04L 65/605 709/231 |
| 2015/0358691 A1 * | 12/2015 | Eun | H04N 21/8113 725/25 |
| 2016/0105901 A1 * | 4/2016 | Lu | H04W 72/10 370/329 |
| 2016/0117711 A1 * | 4/2016 | Seo | G06Q 30/0207 705/14.22 |
| 2016/0269416 A1 * | 9/2016 | Camenisch | H04L 63/065 |
| 2018/0262947 A1 * | 9/2018 | Raleigh | H04W 28/0268 |
| 2019/0306189 A1 * | 10/2019 | Torgerson | H04L 63/10 |

FOREIGN PATENT DOCUMENTS

| | | |
|---|---|---|
| CN | 101944222 A | 1/2011 |
| CN | 102317941 A | 1/2012 |
| CN | 102651751 A | 8/2012 |
| CN | 103188331 A | 7/2013 |
| CN | 103248680 A | 8/2013 |
| CN | 103258020 A | 8/2013 |
| CN | 103295158 A | 9/2013 |
| CN | 103581190 A | 2/2014 |
| CN | 104144196 A | 11/2014 |
| CN | 104519057 A | 4/2015 |
| JP | 2002133235 A | 5/2002 |
| JP | 2002169989 A | 6/2002 |
| JP | 2003052074 A | 2/2003 |
| JP | 2003526850 A | 9/2003 |
| JP | 2009151531 A | 7/2009 |
| JP | 2012238123 A | 12/2012 |
| JP | 2014016977 A | 1/2014 |
| KR | 101372940 B1 | 3/2014 |
| RU | 2008141288 A | 4/2010 |
| RU | 2621293 C2 | 6/2017 |
| WO | WO 2013/085342 A1 | 6/2013 |

OTHER PUBLICATIONS

English version of International Search Report of PCT Application No. PCT/CN2015/077961, dated Sep. 11, 2015, issued by the ISA/CN—State Intellectual Property Office of the P.R. China.
Club Venit, http://clubvenit.com?code=ESMCMA, retrieved from http://m.blog.naver.com/valueyey/30113624232, Jul. 21, 2016, 14 pages.
Tistory, http://nowand.com, retrieved from http://suhminse.tistory.com/864, dated Jul. 21, 2016, 1 page.
International Search Report in International Application No. PCT/CN2015/077961, issued by the State Intellectual Property Office of the P.R. China as ISA, dated Sep. 11, 2015 (4 pages).
Extended European Search Report of European Application No. 15190648.4, issued by the European Patent Office, dated Dec. 4, 2015.
Examiner Report issued in counterpart Indian Application No. 1717/KOLNP/2015, dated Sep. 24, 2019.

* cited by examiner

METHOD AND DEVICE FOR GRANTING AND ACQUIRING QUALIFICATION

CROSS-REFERENCE TO RELATED APPLICATIONS

This application is a Continuation Application of International Application No. PCT/CN2015/077961, filed Apr. 30, 2015, which is based upon and claims priority to Chinese Patent Application No. CN201410770939.6, filed Dec. 12, 2014, the entire contents of both of which are incorporated herein by reference.

TECHNICAL FIELD

The present disclosure relates to Internet technology and, more particularly, to a method and device for granting and acquiring a qualification.

BACKGROUND

A server can provide various services to a user, such as purchasing goods, sending medals, or the like. The user may apply for and use the services via an account registered in the server. However, since some services are provided with a limited availability, the server can only provide such services to some accounts.

In the related art, the server starts receiving applications for a service at an appointed time. However, the number of the users who wish to apply for the service may be large, and the server may receive a great number of application requests from different accounts within a short time period, which can cause network congestion and even server crash.

SUMMARY

In accordance with the present disclosure, there is provided a method for granting a qualification. The method includes receiving a qualification sharing request sent by a granting account for granting a granted account a prioritized application qualification for a target service, detecting whether the granting account has previously used the target service, and, if the granting account has previously used the target service, granting the granted account the prioritized application qualification.

Also in accordance with the present disclosure, there is provided a method for granting a qualification. The method includes acquiring a service identification of a target service and communication information of a granted account, and generating a qualification sharing request according to the service identification and the communication information. The qualification sharing request is a request for granting the granted account a prioritized application qualification for the target service. The method further includes sending the qualification sharing request to a server.

Also in accordance with the present disclosure, there is provided a method for granting a qualification. The method includes receiving a qualification acquiring request sent by a granted account. The qualification acquiring request is a request for acquiring a prioritized application qualification for a target service. The method further includes acquiring a friend relationship chain of the granted account, determining a granting account corresponding to a friend in the friend relationship chain who has previously used the target service, forwarding the qualification acquiring request to the granting account, receiving a qualification grant response sent by the granting account, and granting the granted account the prioritized application qualification.

Also in accordance with the present disclosure, there is provided a method for acquiring a qualification. The method includes sending a qualification acquiring request to a server and acquiring the prioritized application qualification granted by the server. The qualification acquiring request is a request for acquiring a prioritized application qualification for a target service.

Also in accordance with the present disclosure, there is provided a method for granting a qualification. The method includes receiving a qualification acquiring request forwarded by a server and sending a qualification grant response to the server. The qualification acquiring request is a request for acquiring a prioritized application qualification for a target service.

It shall be appreciated that the above general description and the detailed description hereinafter are only illustrative and interpretative but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure.

Through the above accompany drawings, the specific embodiments of the present disclosure have been shown, for which a more detailed description will be given as below. These drawings and textual description are not intended to limit the scope of the concept of the present disclosure in any manner, but to explain the concept of the present disclosure to those skilled in the art through particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

For better understanding, several terms involved in all the embodiments of the present disclosure are briefly described first.

A target service refers to a service provided by a server with a supplied quantity less than a demanded quantity. The target service may be a service for purchasing goods, a service for sending medals, a virtual network service, a virtual gift package service, or the like. For example, the target service is a service for purchasing mobile phones which may have a supplied quantity of 100,000, and a demanded quantity of more than 200,000. The user may apply for and use the service via an account registered with the server.

A prioritized application qualification refers to a qualification to apply for a target service with priority. An account with the prioritized application qualification, which is also referred to as a prioritized account, has a higher priority than an account without the prioritized application qualification, which is also referred to as an ordinary account. In the scenario where the ordinary account cannot apply for the target service, the prioritized account may still be able to apply. Further, in the scenario where both the ordinary account and the prioritized account can apply for the target service, the server accepts the application from the prioritized account with a higher priority than the application from the ordinary account.

Figure 1:
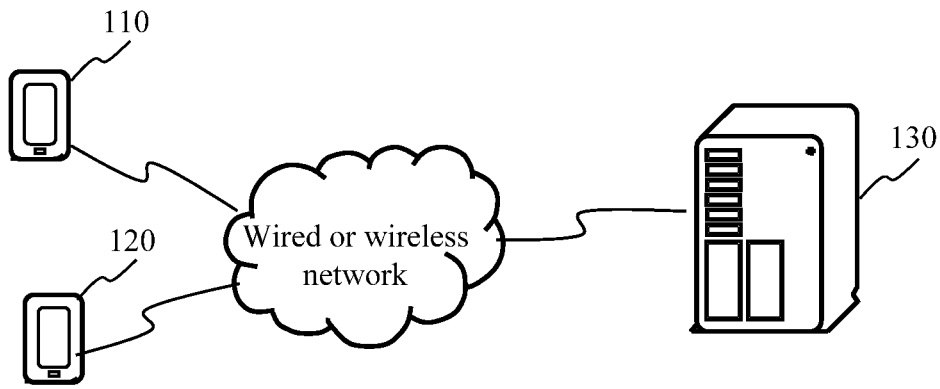
FIG. 1 is a schematic structural diagram illustrating an implementation environment according to exemplary embodiments of the present disclosure.

FIG. 1 is a schematic structural diagram illustrating an implementation environment according to exemplary embodiments of the present disclosure. As illustrated in FIG. 1, the implementation environment may include a first terminal 110 corresponding to a first account, a second terminal 120 corresponding to a second account, and a server 130.

Each of the first terminal 110 and the second terminal 120 includes, for example, a mobile phone, a tablet computer, an electronic book reader, a laptop computer, a desktop computer, or a game console. The first terminal 110 and the second terminal 120 are coupled to the server 130 via a wireless or wired network.

The server 130 may include a computer, a plurality of computers, or a cloud computing center. The server 130 is configured to provide a target service for the first terminal 110 and the second terminal 120.

According to the present disclosure, the second account can acquire a prioritized application qualification for the target service by various approaches. For example, the first account may initiatively send a qualification sharing request for granting the second account a prioritized application qualification for the target service. The server grants the second account the prioritized application qualification for the target service upon receiving the qualification sharing request and detecting that the first account previously used the target service.

As another example, the second account may initiatively send a qualification acquiring request to the server, for acquiring the prioritized application qualification for a target service. The server forwards the qualification acquiring request to the first account, which corresponds to a friend in a friend relationship chain who previously used the target service. Upon receiving a qualification grant response sent by the first account, the server grants the second account the prioritized application qualification for the target service.

The above two methods are described in more detail as follows.

Figure 2:
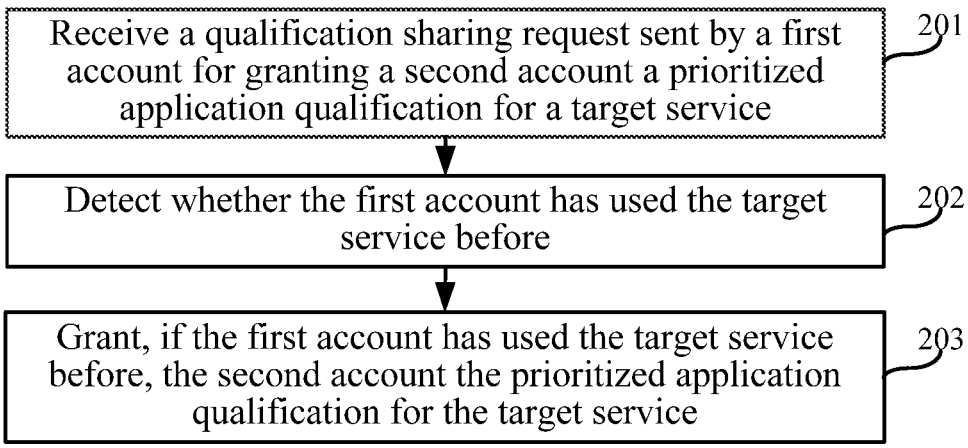
FIG. 2 is a flowchart illustrating a method for granting a qualification according to an exemplary embodiment of the present disclosure.

FIG. 2 is a flowchart illustrating a method for granting a qualification according to an exemplary embodiment of the present disclosure. The method shown in FIG. 2 can be implemented, for example, in the server 130 of FIG. 1. As illustrated in FIG. 2, at 201, a qualification sharing request sent by a first account is received. The qualification sharing request is a request for granting a second account a prioritized application qualification for a target service. At 202, it is detected whether the first account has previously used the target service. At 203, if the first account has previously used the target service, the second account is granted the prioritized application qualification for the target service.

Figure 3:
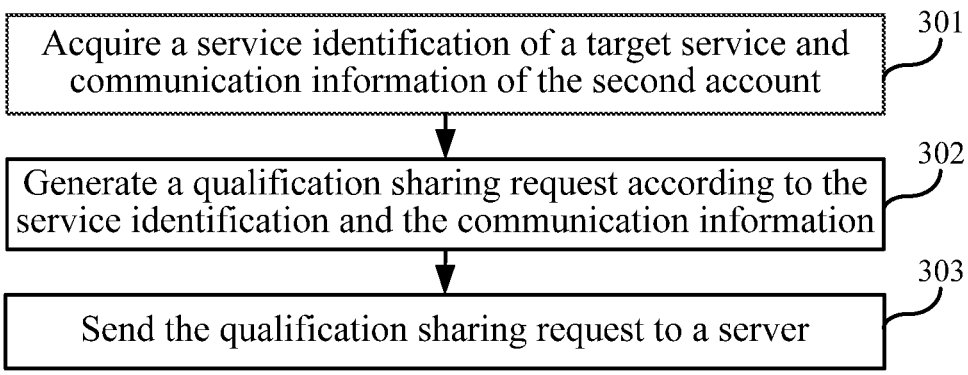
FIG. 3 is a flowchart illustrating a method for granting a qualification according to another exemplary embodiment of the present disclosure.

FIG. 3 is a flowchart illustrating a method for granting a qualification according to another exemplary embodiment of the present disclosure. The method shown in FIG. 3 can be implemented, for example, in the first terminal 110 of FIG. 1. As illustrated in FIG. 3, tat 301, a service identification of a target service and communication information of the second account are acquired. At 302, a qualification sharing request is generated according to the service identification and the communication information. The qualification sharing request is a request for granting the second account a prioritized application qualification for the target service. At 303, the qualification sharing request is sent to a server. The server is configured to grant the second account the prioritized application qualification for the target service upon detecting that the first account has previously used the target service.

Figure 4A:
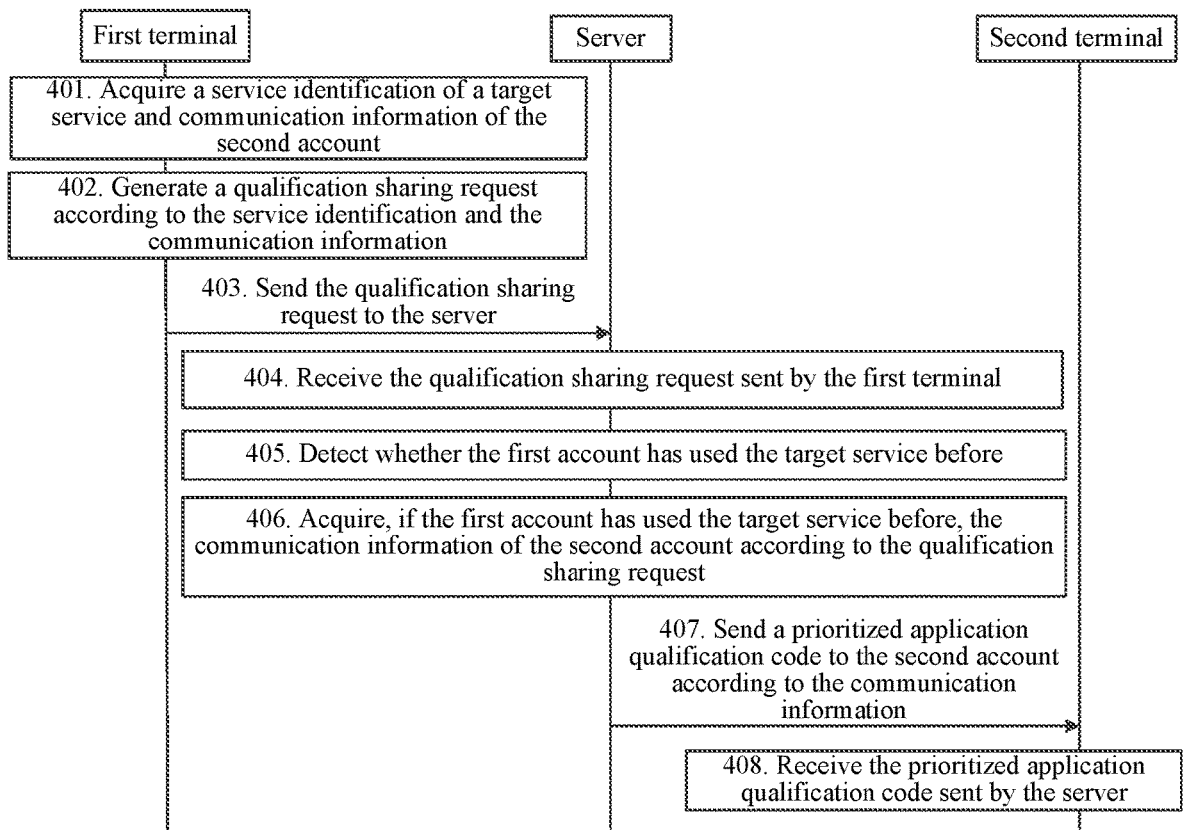
FIG. 4A is a flowchart illustrating a method for granting a qualification according to another exemplary embodiment of the present disclosure.

FIG. 4A is a flowchart illustrating a method for granting a qualification according to another exemplary embodiment of the present disclosure. The method shown in FIG. 4A can be implemented, for example, in the implementation environment of FIG. 1. As illustrated in FIG. 4A, at 401, the first terminal 110 acquires a service identification of a target service and communication information of the second account. According to the present disclosure, the first terminal corresponds to the first account. In other words, a client that is logged in with the first account is run on the first terminal 110. The communication information of the second account may be a telephone number, an Email address, an instant communication account, or the like. If the second account is a communication account, or the communication information of the second account is stored in the server 130, the first terminal can use an account identification of the second account as the communication information of the second account.

In some embodiments, to acquire the service identification of the target service, the first terminal 110 displays an identification input box, and receives the service identification of the target service input by a user in the identification input box. In some embodiments, to acquire the communication information of the second account, the first terminal 110 displays a communication information input box, and receives the communication information of the second account input by a user in the communication information input box.

Figure 4B:
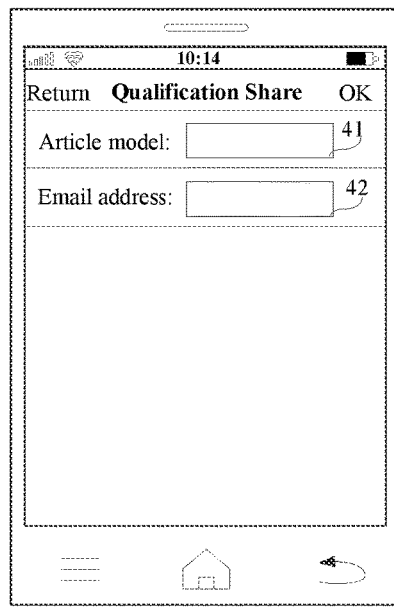
FIG. 4B is a schematic diagram illustrating a display of a first terminal for acquiring a service identification and communication information according to one example.

FIG. 4B schematically shows an interface on the first terminal 110. As shown in FIG. 4B, the first terminal 110 displays an identification input box 41 and a communication information input box 42. Assuming that the target service is a service of purchasing an article A, the user inputs an identification "a" of the article A in the identification input box 41 as the service identification, and inputs the instant communication number "6123456" of the second account in the communication information input box 42.

At 402, the first terminal 110 generates a qualification sharing request according to the service identification and the communication information.

At 403, the first terminal 110 sends the qualification sharing request to the server 130.

At 404, the server 130 receives the qualification sharing request sent by the first terminal 110.

At 405, the server 130 detects whether the first account has previously used the target service. In some embodiments, the server 130 parses out the service identification from the qualification sharing request, and detects whether the first account has used the target service corresponding to the service identification, according to accessing history of the first account. If the accessing history of the first account is stored in another server, the server 130 can send an accessing history query request related to the first account to the other server, receive query results returned by the other server, and detect whether the first account has used the target service corresponding to the service identification according to the query results.

For example, in a case where the target service is the service of purchasing the article A, the server 130 detects whether the first account has previously purchased the article A.

At 406, if the first account has previously used the target service, the server 130 acquires the communication information of the second account according to the qualification sharing request. In some embodiments, the server 130 parses out the communication information of the second account from the qualification sharing request. In some embodiments, the qualification sharing request carries the account identification, rather than the communication information, of the second account. In this scenario, the server 130 queries for the communication information corresponding to the account identification of the second account among stored communication information of all accounts.

At 407, the server 130 sends a prioritized application qualification code to the second account according to the communication information of the second account. The prioritized application qualification code includes a permission to apply for the target service with priority, and may be a character string of a fixed length generated by the server 130. When applying for the target service, the second account may input the prioritized application qualification code to identify the prioritized application qualification to the server 130.

At 408, the second terminal 120 receives the prioritized application qualification code sent by the server 130.

In some embodiments, the server 130 may further detect the number of qualification sharing requests sent by the first account for a same service. If the number of qualification sharing requests reaches a maximum value, the server 130 may not send the prioritized application qualification code to the second account even if the server 130 detects that the first account has previously used the target service. That is, prior to process 406 described above, the server 130 detects whether the number of received qualification sharing requests sent by the first account for the same service reaches the maximum value. If the maximum value has not been reached, the process proceeds to 406.

Figure 5A:
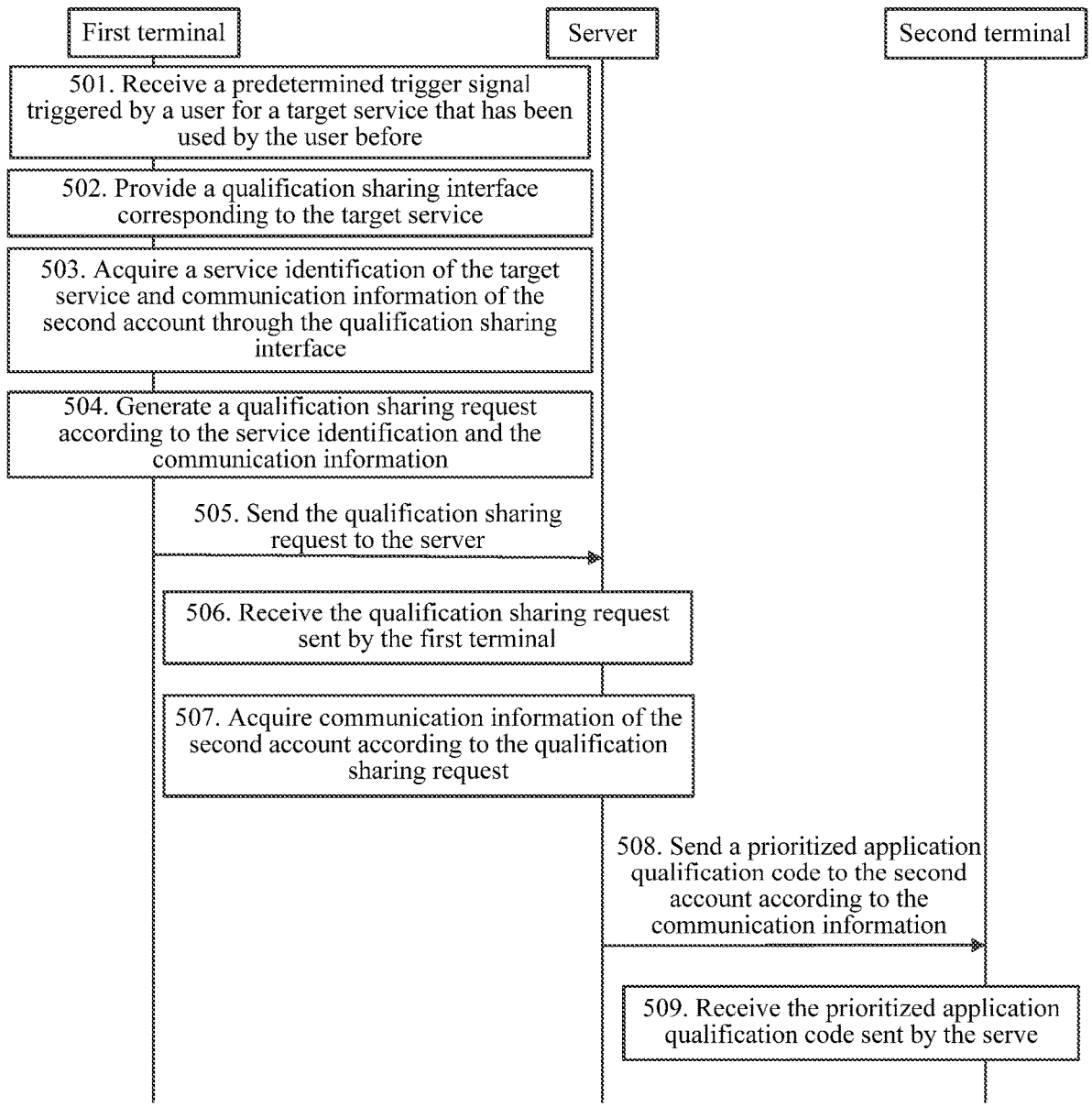
FIG. 5A is a flowchart illustrating a method for granting a qualification according to another exemplary embodiment of the present disclosure.

FIG. 5A is a flowchart illustrating a method for granting a qualification according to another exemplary embodiment of the present disclosure. The method shown in FIG. 5A can be implemented, for example, in the implementation environment of FIG. 1. As illustrated in FIG. 5A, at 501, the first terminal 110 receives a predetermined trigger signal triggered by a user for a target service that has been previously used by the user. The first terminal 110 corresponds to the first account. The first terminal 110 stores an accessing history of the first account. The user can check the accessing history, and trigger the predetermined trigger signal for the target service that the user has previously used. The predetermined trigger signal may be a long press signal.

Figure 5B:
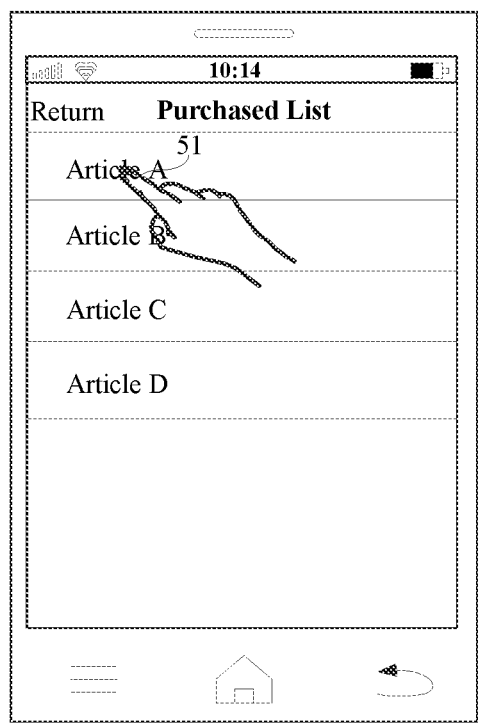
FIG. 5B is a schematic diagram illustrating the display of the first terminal showing a list of articles purchased according to one example.

Referring to FIG. 5B, assuming that the target service is a service of purchasing an article A, and the first terminal stores the accessing history, the user checks the accessing history, and long presses an accessing history 51 associated with the article A, thereby triggering the predetermined trigger signal.

At 502, the first terminal 110 provides a qualification sharing interface corresponding to the target service upon receiving the predetermined trigger signal. The qualification sharing interface includes a communication information input box.

Figure 5C:
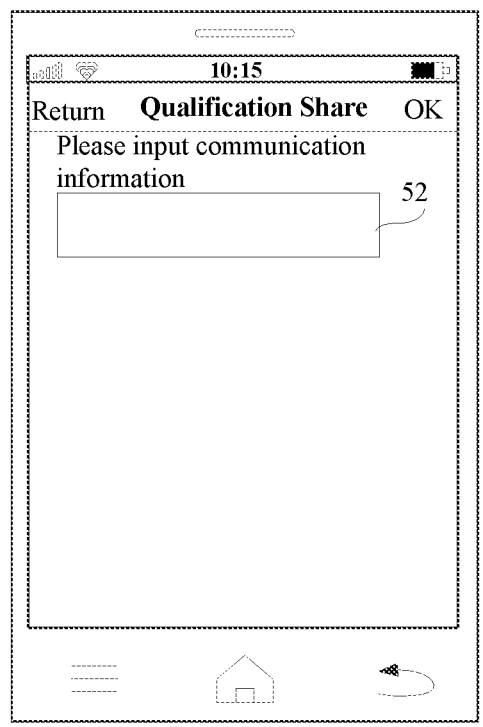
FIG. 5C is a schematic diagram illustrating the display of the first terminal for acquiring communication information according to one example.

Referring to FIG. 5C, the first terminal 110 displays a communication information input box 52 for receiving communication information input by the user.

At 503, the first terminal 110 acquires a service identification of the target service and communication information of the second account through the qualification sharing interface.

The first terminal acquires the service identification of the target service upon receiving the predetermined trigger signal and displaying the qualification sharing interface. For example, as described above, when the user long presses on an article A in FIG. 5B, the first terminal receives the predetermined trigger signal and acquires an article identification "a" of the article A as the service identification.

After the user inputs communication information in the communication information input box on the qualification sharing interface, the first terminal 110 determines the communication information input by the user as the communication information of the second account. For example, when the user inputs a telephone number 13812345678 in the communication information input box 52, the first terminal 110 takes the telephone number 13812345678 as the communication information of the second account.

At 504, the first terminal 110 generates a qualification sharing request according to the service identification and the communication information. The qualification sharing request is a request for granting the second account a prioritized application qualification for the target service.

At 505, the first terminal 110 sends the qualification sharing request to the server 130.

At 506, the server 130 receives the qualification sharing request sent by the first terminal 110.

At 507, the server 130 acquires the communication information of the second account according to the qualification sharing request. In some embodiments, the server 130 parses out the communication information of the second account from the qualification sharing request. In some embodiments, the qualification sharing request carries the account identification, rather than the communication information, of the second account. In this scenario, the server 130 queries for the communication information corresponding to the account identification of the second account among stored communication information of all accounts.

At 508, the server 130 sends a prioritized application qualification code to the second account according to the communication information. The prioritized application qualification code includes a permission to apply for the target service with priority, and may be a character string of a fixed length generated by the server 130.

At 509, the second terminal 120 receives the prioritized application qualification code sent by the server 130.

In some embodiments, to avoid sending a prioritized application qualification code to the second account upon receiving a false qualification sharing request sent by an unauthorized user, the server 130 can detect whether the first account has previously used the target service upon receiving the qualification sharing request sent by the first account. In some embodiments, prior to detecting whether the first account has previously used the target service, the server 130 can further detect whether the number of received qualification sharing requests for the same service has reached the maximum value. If not, the server 130 proceeds with detecting whether the first account has previously used the target service.

Figure 6:
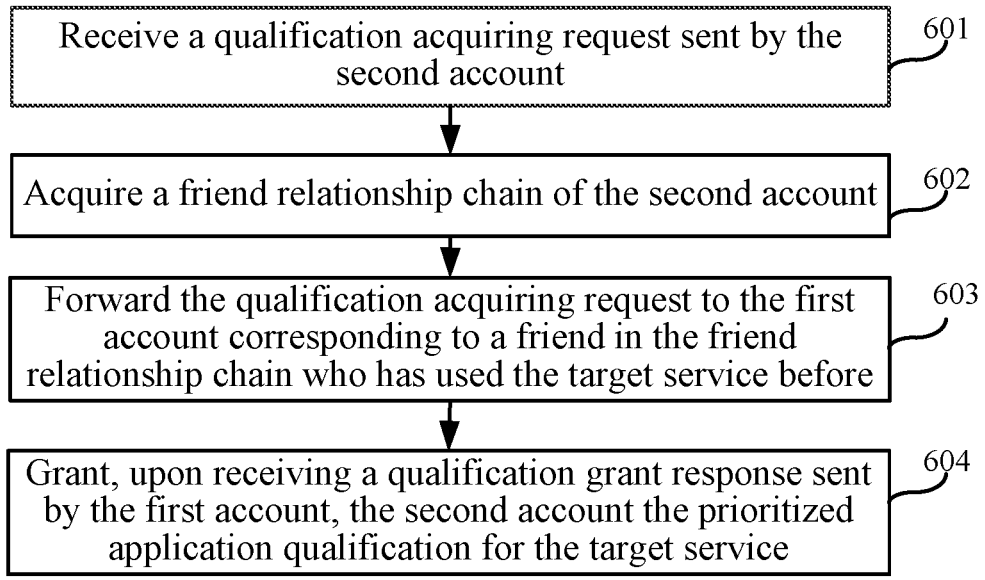
FIG. 6 is a flowchart illustrating a method for granting a qualification according to another exemplary embodiment of the present disclosure.

FIG. 6 is a flowchart illustrating a method for granting a qualification according to another exemplary embodiment of the present disclosure. The method shown in FIG. 6 can be implemented, for example, in the server 130 shown in FIG. 1. As illustrated in FIG. 6, at 601, a qualification acquiring request sent by the second account is received. The qualification acquiring request is a request for acquiring a prioritized application qualification for a target service.

At 602, a friend relationship chain of the second account is acquired.

At 603, the qualification acquiring request is forwarded to the first account corresponding to a friend in the friend relationship chain who has previously used the target service.

At 604, upon receipt of a qualification grant response sent by the first account, the second account is granted the prioritized application qualification for the target service.

Figure 7:
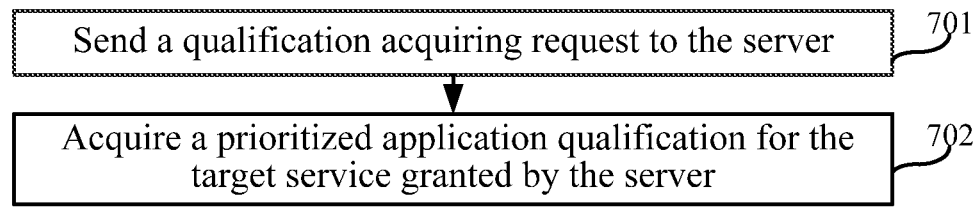
FIG. 7 is a flowchart illustrating a method for acquiring a qualification according to an exemplary embodiment of the present disclosure.

FIG. 7 is a flowchart illustrating a method for acquiring a qualification according to another embodiment of the present disclosure. The method shown in FIG. 7 can be implemented, for example, in the second terminal 120 of FIG. 1. As illustrated in FIG. 7, at 701, a qualification acquiring request is sent to the server 130. The qualification acquiring request is a request for acquiring a prioritized application qualification for a target service. The server 130 is configured to, upon acquiring a friend relationship chain of the second account, forward the qualification acquiring request to the first account corresponding to a friend in the friend relationship chain who has previously used the target service. Upon receiving a qualification grant response sent by the first account, the server 130 grants the second account the prioritized application qualification for the target service.

At 702, the prioritized application qualification for the target service granted by the server 130 is acquired.

Figure 8:
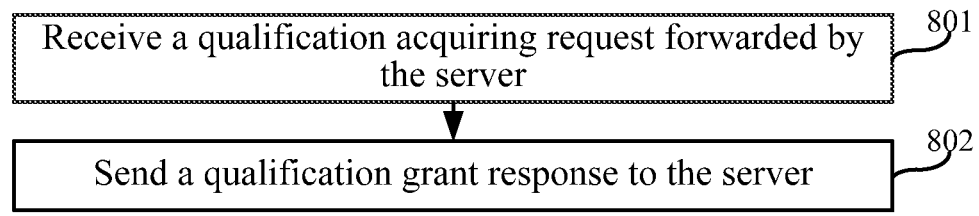
FIG. 8 is a flowchart illustrating a method for granting a qualification according to another exemplary embodiment of the present disclosure.

FIG. 8 is a flowchart illustrating a method for granting a qualification according to another exemplary embodiment of the present disclosure. The method shown in FIG. 8 can be implemented, for example, in the first terminal 110 of FIG. 1. As illustrated in FIG. 8, at 801, a qualification acquiring request forwarded by the server 130 is received. The qualification acquiring request is a request for acquiring a prioritized application qualification for a target service. The qualification acquiring request is sent by the second account to the server 130, and forwarded by the server 130 to the first account upon detecting that the first account has previously used the target service. The first account corresponds to a friend in a friend relationship of the second account.

At 802, a qualification grant response is sent to the server 130. Upon receiving the qualification grant response, the server 130 grants the second account the prioritized application qualification for the target service.

Figure 9:
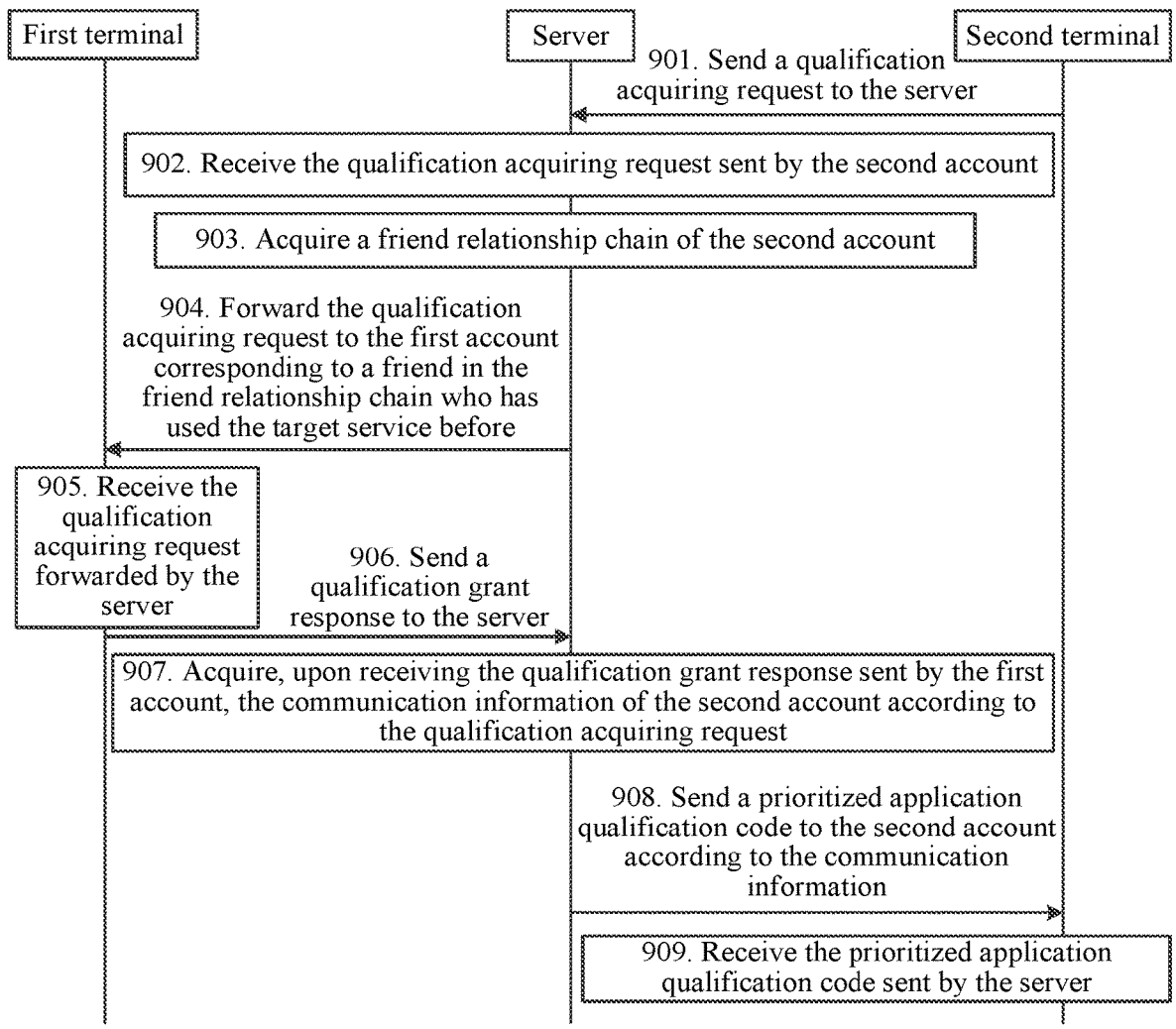
FIG. 9 is a flowchart illustrating a method for granting a qualification according to another exemplary embodiment of the present disclosure.

FIG. 9 is a flowchart illustrating a method for granting a qualification according to another exemplary embodiment of the present disclosure. The method shown in FIG. 9 can be implemented, for example, in the implementation environment of FIG. 1. As illustrated in FIG. 9, at 901, the second terminal 120 sends a qualification acquiring request to the server 130. The second terminal 120 corresponds to the second account. The qualification acquiring request is a request for acquiring a prioritized application qualification for a target service, and carries a service identification of the target service.

At 902, the server 130 receives the qualification acquiring request sent by the second terminal 120.

At 903, the server 130 acquires a friend relationship chain of the second account. In some embodiments, the server 130 parses out communication information of the second account from the qualification acquiring request. The communication information may be a telephone number, an Email address, an instant communication account, or the like. The server 130 acquires the friend relationship chain of the second account according to the communication information of the second account. In some embodiments, the friend relationship chain of the second account is stored in another server. In this scenario, the server 130 sends a query request related to the friend relationship chain to the other server, and receives the friend relationship chain returned by the other server.

For example, if the communication information of the second account is an Email address abcd@164.com, the server 130 acquires the friend relationship chain of the Email address abcd@164.com.

At 904, the server 130 forwards the qualification acquiring request to the first account corresponding to a friend in the friend relationship chain who has previously used the target service. In some embodiments, the server 130 parses out the service identification of the target service from the qualification acquiring request. According to the service identification, the server 130 detects which friend in the friend relationship chain has previously used the target service, and forwards the qualification acquiring request to the first account corresponding to that friend.

In some embodiments, the accessing histories of the friends are stored in at least one other server. In this scenario, the server 130 sends accessing history query requests related to all the friends to the at least one other server, receives query results returned by the at least one other server, and detects whether any friend has used the target service corresponding to the service identification according to the query results.

At 905, the first terminal 110 receives the qualification acquiring request forwarded by the server 130.

At 906, the first terminal 110 sends a qualification grant response to the server 130, if the first account agrees to grant the second account the prioritized application qualification for the target service.

At 907, upon receiving the qualification grant response sent by the first account 110, the server 130 acquires the communication information of the second account according to the qualification acquiring request. In some embodiments, the server 130 parses out the communication information of the second account from the qualification acquiring request. In some embodiments, if the communication information of the second account has already been parsed out at 903, the server 130 can directly read the communication information of the second account that was previously acquired.

At 908, the server 130 sends a prioritized application qualification code to the second account according to the communication information. The prioritized application qualification code includes a permission to apply for the target service with priority, and may be a character string of a fixed length generated by the server 130.

At 909, the second terminal 120 receives the prioritized application qualification code sent by the server 130.

In some embodiments, prior to the process at 907, the server 130 may detect whether the number of received qualification grant responses corresponding to the same service sent by the first account reaches the maximum value. If so, the process is ended. If the number of received qualification grant responses corresponding to the same service sent by the first account has not reached the maximum value, the server 130 proceeds with 907.

Devices consistent with the present disclosure are described below. The devices can be used to perform the methods consistent with embodiments of the present disclosure. Detailed description of the functions of the devices is omitted, for which reference can be made to the methods described above.

Figure 10:
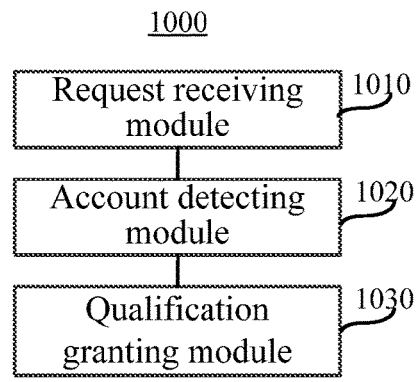
FIG. 10 is a block diagram illustrating a device for granting a qualification according to an exemplary embodiment of the present disclosure.

FIG. 10 is a structural block diagram illustrating a device 1000 for granting a qualification according to an exemplary embodiment of the present disclosure. The device 1000 may be implemented, for example, in the server 130 of FIG. 1. As illustrated in FIG. 10, the device 1000 includes a request receiving module 1010, an account detecting module 1020, and a qualification granting module 1030.

The request receiving module 1010 is configured to receive a qualification sharing request sent by a first account for granting a second account a prioritized application qualification for a target service.

The account detecting module 1020 is configured to detect whether the first account has previously used the target service.

The qualification granting module 1030 is configured to grant the second account the prioritized application qualification for the target service if the account detecting module 1020 detects that the first account has previously used the target service.

Figure 11:
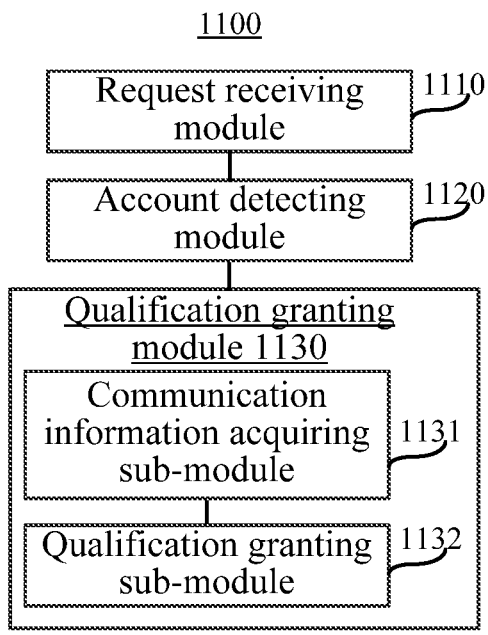
FIG. 11 is a block diagram illustrating a device for granting a qualification according to another exemplary embodiment of the present disclosure.

FIG. 11 is a structural block diagram illustrating a device 1100 for granting a qualification according to another exemplary embodiment of the present disclosure. The device 1100 may be implemented, for example, in the server 130 of FIG. 1. As illustrated in FIG. 11, the device 1100 includes a request receiving module 1110, an account detecting module 1120, and a qualification granting module 1130. The request receiving module 1110 and the account detecting module 1120 of the device 1100 are similar to the request receiving module 1010 and the account detecting module 1020 of the device 1000.

The qualification granting module 1130 is also similar to the qualification granting module 1030, except that the qualification granting module 1130 includes a communication information acquiring sub-module 1131 and a qualification granting sub-module 1132. The communication information acquiring sub-module 1131 is configured to acquire communication information of the second account according to the qualification sharing request. The qualification granting sub-module 1132 is configured to send a prioritized application qualification code to the second account according to the communication information acquired by the communication information acquiring sub-module 1131. The prioritized application qualification code includes a permission to apply for the target service with priority.

Figure 12:
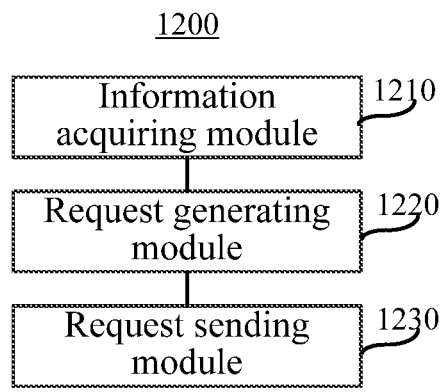
FIG. 12 is a block diagram illustrating a device for granting a qualification according to another exemplary embodiment of the present disclosure.

FIG. 12 is a structural block diagram illustrating a device 1200 for granting a qualification according to another exemplary embodiment of the present disclosure. The device 1200 may be implemented, for example, in the first terminal 110 of FIG. 1. As illustrated in FIG. 12, the device 1200 includes an information acquiring module 1210, a request generating module 1220, and a request sending module 1230.

The information acquiring module 1210 is configured to acquire a service identification of a target service and communication information of the second account.

The request generating module 1220 is configured to generate a qualification sharing request according to the service identification and the communication information. The qualification sharing request is a request for granting the second account a prioritized application qualification for the target service.

The request sending module 1230 is configured to send the qualification sharing request generated by the request generating module 1220 to a server. The server then grants the second account the prioritized application qualification for the target service upon detecting that the first account has previously used the target service.

Figure 13:
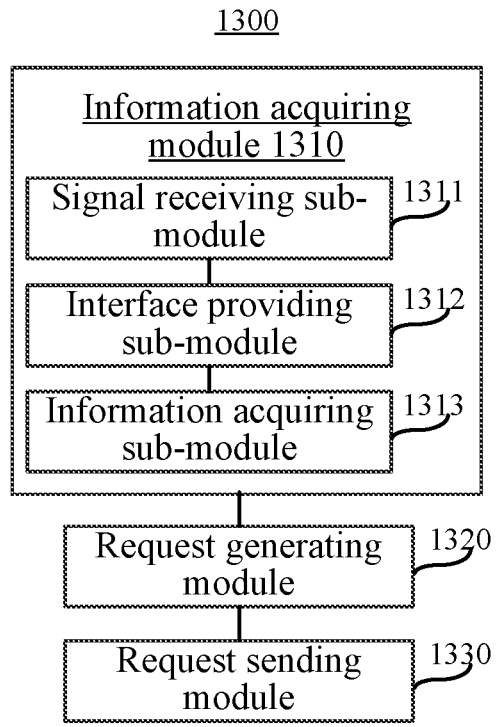
FIG. 13 is a block diagram illustrating a device for granting a qualification according to another exemplary embodiment of the present disclosure.

FIG. 13 is a structural block diagram illustrating a device 1300 for granting a qualification according to another exemplary embodiment of the present disclosure. The device 1300 may be implemented, for example, in the first terminal 110 of FIG. 1. As illustrated in FIG. 13, the device 1300 includes an information acquiring module 1310, a request generating module 1320, and a request sending module 1330. The request generating module 1320 and the request sending module 1330 of the device 1300 are similar to the request generating module 1220 and the request sending module 1230 of the device 1200.

The information acquiring module 1310 is also similar to the information acquiring module 1310, except that the information acquiring module 1310 includes a signal receiving sub-module 1311, an interface providing sub-module 1312, and an information acquiring sub-module 1313. The signal receiving sub-module 1311 is configured to receive a predetermined trigger signal triggered by a user for a target service that the user has previously used. The interface providing sub-module 1312 is configured to provide a qualification sharing interface corresponding to the target service. The information acquiring sub-module 1313 is configured to acquire the service identification of the target service and the communication information of the second account according to the qualification sharing interface provided by the interface providing sub-module 1312.

Figure 14:
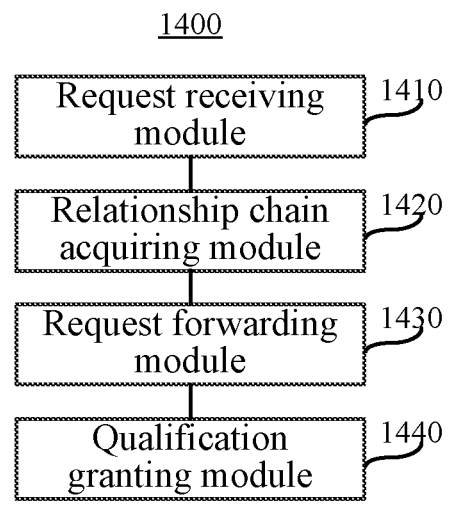
FIG. 14 is a block diagram illustrating a device for granting a qualification according to another exemplary embodiment of the present disclosure.

FIG. 14 is a structural block diagram illustrating a device 1400 for granting a qualification according to another exemplary embodiment of the present disclosure. The device 1400 may be implemented, for example, in the server 130 of FIG. 1. As illustrated in FIG. 14, the device 1400 includes a request receiving module 1410, a relationship chain acquiring module 1420, a request forwarding module 1430, and a qualification granting module 1440.

The request receiving module 1410 is configured to receive a qualification acquiring request sent by the second account. The qualification acquiring request is a request for acquiring a prioritized application qualification for a target service.

The relationship chain acquiring module 1420 is configured to acquire a friend relationship chain of the second account.

The request forwarding module 1430 is configured to forward the qualification acquiring request to the first account corresponding to a friend in the friend relationship chain who has previously used the target service.

The qualification granting module 1440 is configured to grant the second account the prioritized application qualification for the target service upon receiving a qualification grant response sent by the first account.

Figure 15:
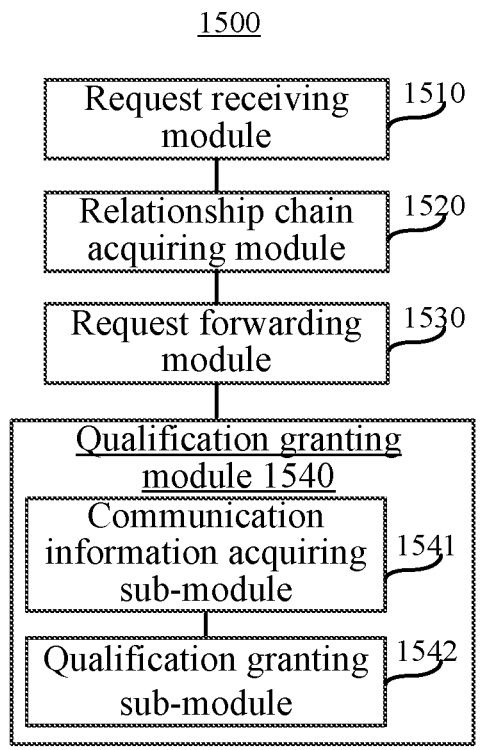
FIG. 15 is a block diagram illustrating a device for granting a qualification according to another exemplary embodiment of the present disclosure.

FIG. 15 is a structural block diagram illustrating a device 1500 for granting a qualification according to another exemplary embodiment of the present disclosure. The device 1500 may be implemented, for example, in the server 130 of FIG. 1. As illustrated in FIG. 15, the device 1500 includes a request receiving module 1510, a relationship chain acquiring module 1520, a request forwarding module 1530, and a qualification granting module 1540. The request receiving module 1510, the relationship chain acquiring module 1520, and the request forwarding module 1530 of the device 1500 are similar to the request receiving module 1410, the relationship chain acquiring module 1420, and the request forwarding module 1430 of the device 1400.

The qualification granting module 1540 is also similar to the qualification granting module 1440, except that the qualification granting module 1540 includes a communication information acquiring sub-module 1541 and a qualification granting sub-module 1542. The communication information acquiring sub-module 1541 is configured to acquire communication information of the second account according to the qualification acquiring request. The qualification granting sub-module 1542 is configured to send a prioritized application qualification code to the second account according to the communication information. The prioritized application qualification code includes a permission to apply for the target service with priority.

Figure 16:
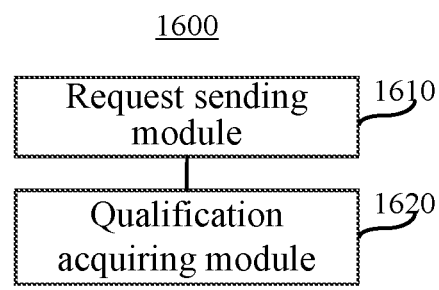
FIG. 16 is a block diagram illustrating a device for acquiring a qualification according to another exemplary embodiment of the present disclosure.

FIG. 16 is a structural block diagram illustrating a device 1600 for acquiring a qualification according to an exemplary embodiment of the present disclosure. The device 1600 may be implemented, for example, in the second terminal 120 of FIG. 1. As illustrated in FIG. 16, the device 1600 includes a request sending module 1610 and a qualification acquiring module 1620.

The request sending module 1610 is configured to send a qualification acquiring request to a server. The qualification acquiring request is a request for acquiring a prioritized application qualification for a target service. Upon receiving the qualification acquiring request, the server acquires a friend relationship chain of the second account and forwards the qualification acquiring request to the first account corresponding to a friend in the friend relationship chain who has previously used the target service. Upon receiving a qualification grant response sent by the first account, the server grants the second account the prioritized application qualification for the target service.

The qualification acquiring module 1620 is configured to acquire the prioritized application qualification for the target service granted by the server.

In some embodiments, the qualification acquiring module 1620 is further configured to receive a prioritized application qualification code sent by the server. The prioritized application qualification code includes a permission to apply for the target service with priority.

Figure 17:
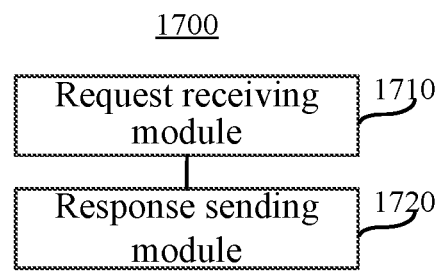
FIG. 17 is a block diagram illustrating a device for granting a qualification according to another exemplary embodiment of the present disclosure.

FIG. 17 is a structural block diagram illustrating a device 1700 for granting a qualification according to another exemplary embodiment of the present disclosure. The device 1700 may be implemented, for example, in the first terminal 110 of FIG. 1. As illustrated in FIG. 17, the device 1700 includes a request receiving module 1710 and a response sending module 1720.

The request receiving module 1710 is configured to receive a qualification acquiring request forwarded by a server. The qualification acquiring request is a request for acquiring a prioritized application qualification for a target service. The qualification acquiring request is sent by the second account to the server and forwarded by the server to the first account upon detecting that the first account has previously used the target service. The first account is an account corresponding to a friend in a friend relationship of the second account.

The response sending module 1720 is configured to send a qualification grant response to the server. Upon receiving the qualification grant response, the server grants the second account the prioritized application qualification for the target service.

Figure 18:
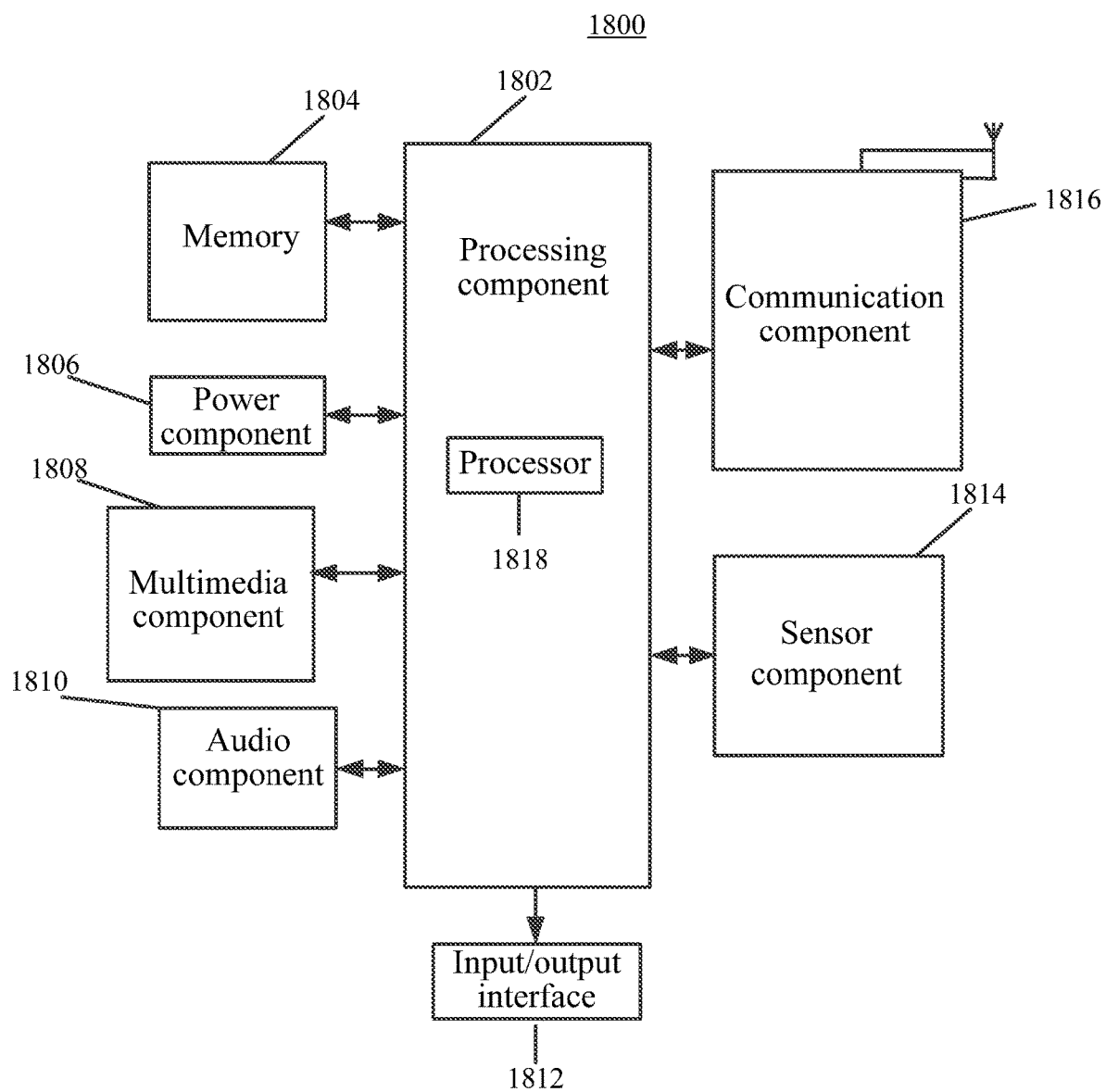
FIG. 18 is a block diagram illustrating a terminal according to an exemplary embodiment of the present disclosure.

FIG. 18 is a block diagram illustrating a terminal 1800 according to an exemplary embodiment of the present disclosure. The terminal 1800 may be the first terminal 110 or the second terminal 120 shown in FIG. 1. For example, the terminal 1800 may be a mobile phone, a computer, a digital broadcast terminal, a messaging device, a gaming console, a tablet, a medical device, exercise equipment, a personal digital assistant, or the like.

Referring to FIG. 18, the terminal 1800 includes one or more of the following components: a processing component 1802, a memory 1804, a power component 1806, a multimedia component 1808, an audio component 1810, an input/output (I/O) interface 1812, a sensor component 1814, and a communication component 1816.

The processing component 1802 typically controls overall operations of the terminal 1800, such as the operations associated with display, telephone calls, data communications, camera operations, and recording operations. The processing component 1802 may include one or more processors 1818 to execute instructions to perform all or a part of the methods consistent with embodiments of the present disclosure. In addition, the processing component 1802 may include one or more modules which facilitate the interaction between the processing component 1802 and other components. For example, the processing component 1802 may include a multimedia module to facilitate the interaction between the multimedia component 1808 and the processing component 1802.

The memory 1804 is configured to store various types of data to support the operations of the terminal 1800. Examples of such data include instructions for any application or method operated on the terminal 1800, contact data, phonebook data, messages, pictures, videos, and the like. The memory 1804 may be implemented as any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1806 provides power to various components of the terminal 1800. The power component 1806 may include a power management system, one or more power supplies, and other components associated with the generation, management, and distribution of power in the terminal 1800.

The multimedia component 1808 includes a screen providing an output interface between the terminal 1800 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1808 includes a front camera and/or a rear camera. The front camera and/or the rear camera may receive external multimedia data while the terminal 1800 is in an operation mode, such as a photographing mode or a video mode. Each of the front camera and the rear camera may be a fixed optical lens system or have focus and optical zoom capability.

The audio component 1810 is configured to output and/or input audio signals. For example, the audio component 1810 includes a microphone configured to receive an external audio signal when the apparatus 1800 is in an operation mode, such as a call mode, a recording mode, or a voice recognition mode. The received audio signal may be further stored in the memory 1804 or transmitted via the communication component 1816. In some embodiments, the audio component 1810 further includes a speaker to output audio signals.

The I/O interface 1812 provides an interface between the processing component 1802 and a peripheral interface module, such as a keyboard, a click wheel, a button, or the like. The buttons may include, but are not limited to, a home button, a volume button, a starting button, and a locking button.

The sensor component 1814 includes one or more sensors to provide status assessments of various aspects of the terminal 1800. For example, the sensor component 1814 may detect an open/closed status of the terminal 1800, relative positioning of components, e.g., the display and the keypad, of the terminal 1800, a change in position of the terminal 1800 or a component of the terminal 1800, a presence or absence of user contact with the terminal 1800, an orientation or an acceleration/deceleration of the terminal 1800, and a change in temperature of the terminal 1800. The sensor component 1814 may include a proximity sensor configured to detect the presence of nearby objects without any physical contact. The sensor component 1814 may also include a light sensor, such as a CMOS or CCD image sensor, for use in imaging applications. In some embodiments, the sensor component 1814 may also include an accelerometer sensor, a gyroscope sensor, a magnetic sensor, a pressure sensor, or a temperature sensor.

The communication component 1816 is configured to facilitate communications, wired or wirelessly, between the terminal 1800 and other devices. The terminal 1800 may access a wireless network based on a communication standard, such as WiFi, 2G, 3G, or 4G or a combination thereof. In an exemplary embodiment, the communication component 1816 receives a broadcast signal or broadcast associated information from an external broadcast management system via a broadcast channel. In an exemplary embodiment, the communication component 1816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 1800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as the memory 1804 including instructions, executable by the processor 1818 in the terminal 1800, for performing the methods consistent with embodiments of the present disclosure. For example, the non-transitory computer-readable storage medium may be a ROM, a random access memory (RAM), a compact disc read-only memory (CD-ROM), a magnetic tape, a floppy disc, an optical data storage device, or the like.

Figure 19:
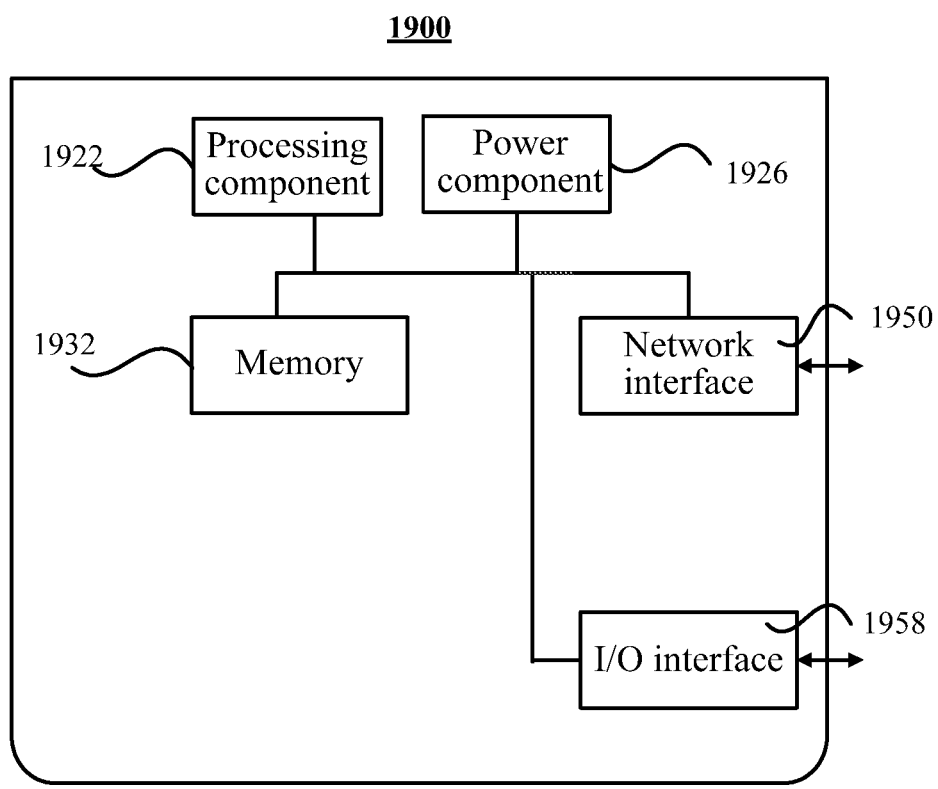
FIG. 19 is a block diagram illustrating a server according to an exemplary embodiment of the present disclosure.

FIG. 19 is a block diagram illustrating a device 1900 according to another exemplary embodiment of the present disclosure. For example, the device 1900 may be provided as a server. Referring to FIG. 19, the device 1900 includes a processing component 1922, which further includes one or more processors; and memory resources represented by a memory 1932, configured to store instructions executable by the processing component 1922, for example, applications. The applications stored in the memory 1932 may include one or more modules each corresponding to a group of instructions. In addition, the processing component 1922 is configured to execute the instructions, to perform the methods consistent with embodiments of the present disclosure.

The device 1900 may further include a power component 1926, configured to perform power management in the device 1900; a wired or wireless network interface 1950, configured to connect the device 1900 to a network; and an input/output (I/O) interface 1958. The device 1900 may operate an operating system stored in the memory 1932, for example, Windows Server™, Mac OS X™, Unix™, Linux™, FreeBSD™, or the like.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for granting a qualification, comprising:
   receiving, at a server, a qualification sharing request sent by a granting account for granting a granted account a prioritized application qualification for a target service provided by the server via a wireless or wired network, the qualification sharing request carrying a service identification of the target service and communication information of the granted account, the prioritized application qualification being a qualification to apply for using the target service with a higher priority than an account without the prioritized application qualification, the target service provided by the server being a service with a supplied quantity less than a demanded quantity;
   determining, by the server, whether the granting account has previously used the target service and whether a number of received qualification sharing requests for the target service has reached a maximum value; and
   in response to a determination that the granting account has previously used the target service and the number of received qualification sharing requests for the target service has not reached a maximum value, granting, by the server, the granted account the prioritized application qualification.

2. The method according to claim 1, wherein granting the granted account the prioritized application qualification includes:
   acquiring the communication information of the granted account according to the qualification sharing request; and
   sending a prioritized application qualification code to the granted account according to the communication information, the prioritized application qualification code containing a permission to apply for the target service with priority.

3. The method according to claim 2, wherein acquiring the communication information of the granted account includes:
   acquiring an account identification of the granted account from the qualification sharing request; and
   querying for the communication information of the granted account according to the account identification among stored communication information of all accounts.

4. The method according to claim 1, wherein determining whether the granting account has previously used the target service includes:
   parsing out the service identification of the target service from the qualification sharing request;
   acquiring an accessing history of the granting account according to the service identification; and
   determining whether the granting account has previously used the target service according to the accessing history.

5. A method for granting a qualification, comprising:
   acquiring a service identification of a target service provided by a server and communication information of a granted account, the target service provided by the server being a service with a supplied quantity less than a demanded quantity;
   generating a qualification sharing request according to the service identification and the communication information, the qualification sharing request being a request for granting the granted account a prioritized application qualification for the target service provided by the server via a wireless or wired network and carrying the service identification of the target service and communication information of the granted account, the prioritized application qualification being a qualification to apply for using the target service with a higher priority than an account without the prioritized application qualification; and
   sending the qualification sharing request to the server via the wireless or wired network, the server being configured to grant the granted account the prioritized application qualification for the target service upon detecting that a granting account has previously used the target service and a number of received qualification sharing requests for the target service has not reached a maximum value.

6. The method according to claim 5, wherein acquiring the service identification and the communication information includes:
   receiving a signal triggered by a user for the target service that has been previously used by the user;
   providing a qualification sharing interface corresponding to the target service; and
   acquiring the service identification and the communication information through the qualification sharing interface.

7. The method according to claim 5, wherein acquiring the communication information includes acquiring at least one of a telephone phone number, an Email address, or an instant communication account of the granted account.

8. A method for granting a qualification, comprising:
   receiving, at a server, a qualification acquiring request sent by a granted account, the qualification acquiring request being a request for acquiring a prioritized application qualification for a target service provided by the server via a wireless or wired network and carrying a service identification of the target service and communication information of the granted account, the prioritized application qualification being a qualification to apply for using the target service with a higher priority than an account without the prioritized application qualification, the target service provided by the server being a service with a supplied quantity less than a demanded quantity;

acquiring a friend relationship chain of the granted account;

determining a granting account corresponding to a friend in the friend relationship chain who has previously used the target service;

forwarding the qualification acquiring request to the granting account;

receiving a qualification grant response sent by the granting account; and after receiving the qualification grant response, granting the granted account the prioritized application qualification if it is determined that a number of received qualification sharing requests for the target service has not reached a maximum value.

9. The method according to claim 8, wherein acquiring the friend relationship chain includes:

parsing out the communication information of the granted account from the qualification acquiring request; and acquiring the friend relationship chain according to the communication information.

10. The method according to claim 9, wherein parsing out communication information includes parsing out at least one of a telephone number, an Email address, or an instant communication account of the granted account.

11. The method according to claim 8, wherein determining the granting account includes:

parsing out the service identification of the target service from the qualification acquiring request; and determining the granting account according to the service identification.

12. The method according to claim 8, wherein granting the granted account the prioritized application qualification includes:

acquiring communication information of the granted account according to the qualification acquiring request; and sending a prioritized application qualification code to the granted account according to the communication information, the prioritized application qualification code containing a permission to apply for the target service with priority.

13. A method for acquiring a qualification, comprising:

sending a qualification acquiring request to a server, the qualification acquiring request being a request for acquiring a prioritized application qualification for a target service provided by the server via a wireless or wired network and carrying a service identification of the target service and communication information of the granted account, the prioritized application qualification being a qualification to apply for using the target service with a higher priority than an account without the prioritized application qualification, the target service provided by the server being a service with a supplied quantity less than a demanded quantity; and acquiring the prioritized application qualification granted by the server when the server determines a granting account has previously used the target service and a number of received qualification sharing requests for the target service has not reached a maximum value.

14. The method according to claim 13, wherein acquiring the prioritized application qualification includes:

receiving a prioritized application qualification code sent by the server, the prioritized application qualification code containing a permission to apply for the target service with priority.

15. A method for granting a qualification, comprising:

receiving a qualification acquiring request forwarded by a server, the qualification acquiring request being a request for acquiring a prioritized application qualification for a target service provided by the server via a wireless or wired network and carrying a service identification of the target service and communication information of the granted account, the prioritized application qualification being a qualification to apply for using the target service with a higher priority than an account without the prioritized application qualifications, the target service provided by the server being a service with a supplied quantity less than a demanded quantity; and sending a qualification grant response to the server, if a granting account has previously used the target service and a number of qualification sharing requests for the target service has not reached a maximum value.

* * * * *